United States Patent
Roy Thill et al.

(10) Patent No.: US 11,125,099 B2
(45) Date of Patent: Sep. 21, 2021

(54) BOAS ARRANGEMENT WITH DOUBLE DOVETAIL ATTACHMENTS

(71) Applicant: United Technologies Corporation, Farmington, CT (US)

(72) Inventors: Carson A. Roy Thill, South Berwick, ME (US); Andrew D. Keene, Portland, ME (US); Danielle Mahoney, Dover, NH (US); Jaime A. Arbona, West Palm Beach, FL (US); Justin K. Bleil, Sanford, ME (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 16/675,881

(22) Filed: Nov. 6, 2019

(65) Prior Publication Data

US 2021/0131301 A1    May 6, 2021

(51) Int. Cl.
*F01D 11/08*    (2006.01)
*F01D 25/24*    (2006.01)

(52) U.S. Cl.
CPC ............ *F01D 11/08* (2013.01); *F01D 25/246* (2013.01); *F05C 2203/08* (2013.01); *F05D 2220/323* (2013.01); *F05D 2230/60* (2013.01); *F05D 2240/11* (2013.01); *F05D 2240/55* (2013.01); *F05D 2260/30* (2013.01); *F05D 2300/6033* (2013.01)

(58) Field of Classification Search
CPC ...... F01D 11/08; F01D 11/003; F01D 11/004; F01D 25/246; F05D 2240/11; F05D 2260/30; F05D 2300/6033
See application file for complete search history.

(56) References Cited

U.S. PATENT DOCUMENTS

| 7,052,235 | B2* | 5/2006 | Alford | F01D 9/04 |
| | | | | 415/173.1 |
| 9,039,358 | B2* | 5/2015 | Tholen | F01D 11/08 |
| | | | | 415/173.3 |
| 10,030,541 | B2 | 7/2018 | Vetters et al. | |
| 10,060,294 | B2* | 8/2018 | Lamusga | F01D 9/02 |
| | | | (Continued) | |

FOREIGN PATENT DOCUMENTS

| EP | 1965031 | 9/2008 |
| EP | 3088689 | 11/2016 |

OTHER PUBLICATIONS

The Extended EP Search Report for EP Application No. 20206166.9 dated Apr. 13, 2021.

*Primary Examiner* — Woody A Lee, Jr.
*Assistant Examiner* — Maxime M Adjagbe
(74) *Attorney, Agent, or Firm* — Carlson, Gaskey & Olds, P.C.

(57) ABSTRACT

A flow path component assembly includes a support structure. A flow path component has a plurality of segments that are arranged circumferentially about an axis and are mounted in the support structure by a carrier. At least one of the segments have a first wall axially spaced from a second wall. The first wall has first and second hooks spaced apart from one another in a circumferential direction. The second wall has third and fourth hooks spaced apart from one another in the circumferential direction. The first, second, third, and fourth hooks are in engagement with the carrier.

19 Claims, 5 Drawing Sheets

(56) References Cited

U.S. PATENT DOCUMENTS

| | | |
|---|---|---|
| 10,138,749 B2 | 11/2018 | McCaffrey |
| 10,364,693 B2 | 7/2019 | Thomas et al. |
| 2016/0319688 A1* | 11/2016 | Vetters ...................... F01D 5/02 |
| 2017/0350268 A1* | 12/2017 | McCaffrey .............. F01D 11/08 |
| 2018/0340440 A1 | 11/2018 | Freeman |

* cited by examiner

BOAS ARRANGEMENT WITH DOUBLE DOVETAIL ATTACHMENTS

BACKGROUND

This application relates to a blade outer air seal having dovetail attachments.

Gas turbine engines are known and typically include a compressor compressing air and delivering it into a combustor. The air is mixed with fuel in the combustor and ignited. Products of the combustion pass downstream over turbine rotors, driving them to rotate.

It is desirable to ensure that the bulk of the products of combustion pass over turbine blades on the turbine rotor. As such, it is known to provide blade outer air seals radially outwardly of the blades. Some gas turbine engine components are formed from ceramic materials.

SUMMARY

In one exemplary embodiment, a flow path component assembly includes a support structure. A flow path component has a plurality of segments that are arranged circumferentially about an axis and are mounted in the support structure by a carrier. At least one of the segments have a first wall axially spaced from a second wall. The first wall has first and second hooks spaced apart from one another in a circumferential direction. The second wall has third and fourth hooks spaced apart from one another in the circumferential direction. The first, second, third, and fourth hooks are in engagement with the carrier.

In a further embodiment of any of the above, the first hook extends generally in a first circumferential direction. The second hook extends generally in a second circumferential direction opposite the first circumferential direction.

In a further embodiment of any of the above, the first and second hooks form a dovetail shape for engagement with the support structure.

In a further embodiment of any of the above, the third and fourth hooks form the dovetail shape for engagement with the support structure.

In a further embodiment of any of the above, the carrier has a first angled surface circumferentially spaced from a second angled surface. The first angled surface is in engagement with the first and third hooks and the second angled surface is in engagement with the third and fourth hooks.

In a further embodiment of any of the above, the first and second walls extend from a base portion. The base portion extends axially forward of the first wall and axially aft of the second wall.

In a further embodiment of any of the above, a tab extends from one of the first and second walls in a generally radial direction and engages a portion of the support structure.

In a further embodiment of any of the above, a slot is formed in the support structure for receiving the tab.

In a further embodiment of any of the above, the flow path component is a ceramic material.

In a further embodiment of any of the above, the flow path component is formed from a plurality of ceramic matrix composite plies. An overwrap ply extends over the first and second walls.

In a further embodiment of any of the above, a liner is arranged between the first, second, third, and fourth hooks and the carrier.

In a further embodiment of any of the above, the carrier is a metallic material.

In another exemplary embodiment, a turbine section for a gas turbine engine includes a turbine blade that extends radially outwardly to a radially outer tip and for rotation about an axis of rotation. A blade outer air seal has a plurality of seal segments that are arranged circumferentially about an axis and are mounted radially outward of the radially outer tip by a carrier. At least one of the seal segments has a first wall axially spaced from a second wall. The first wall has first and second hooks spaced apart from one another in a circumferential direction. The second wall has third and fourth hooks spaced apart from one another in the circumferential direction. The first, second, third, and fourth hooks are in engagement with the carrier.

In a further embodiment of any of the above, the first hook extends generally in a first circumferential direction. The second hook extends generally in a second circumferential direction opposite the first circumferential direction.

In a further embodiment of any of the above, the first and second hooks form a dovetail shape for engagement with the support structure. The third and fourth hooks form the dovetail shape for engagement with the support structure.

In a further embodiment of any of the above, the carrier has a first angled surface circumferentially spaced from a second angled surface. The first angled surface is in engagement with the first and third hooks and the second angled surface is in engagement with the third and fourth hooks.

In a further embodiment of any of the above, a tab extends from one of the first and second walls in a generally radial direction and engages a portion of the support structure. A slot is formed in the support structure for receiving the tab.

In a further embodiment of any of the above, the blade outer air seal is a ceramic material.

In a further embodiment of any of the above, a metallic liner is arranged between the first, second, third, and fourth hooks and the carrier.

In a further embodiment of any of the above, the carrier is a metallic material.

DETAILED DESCRIPTION

Figure 1:
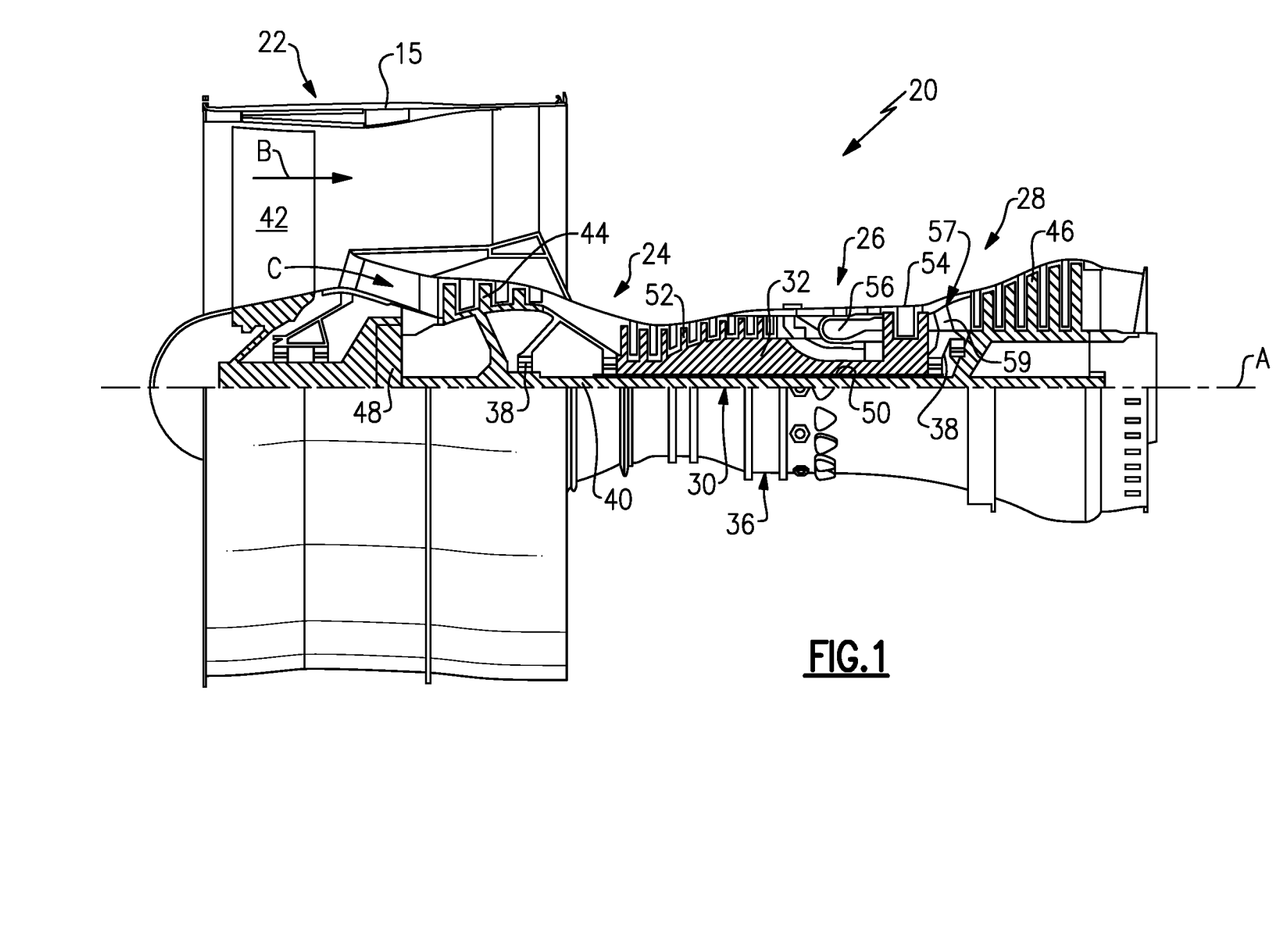
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine engine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
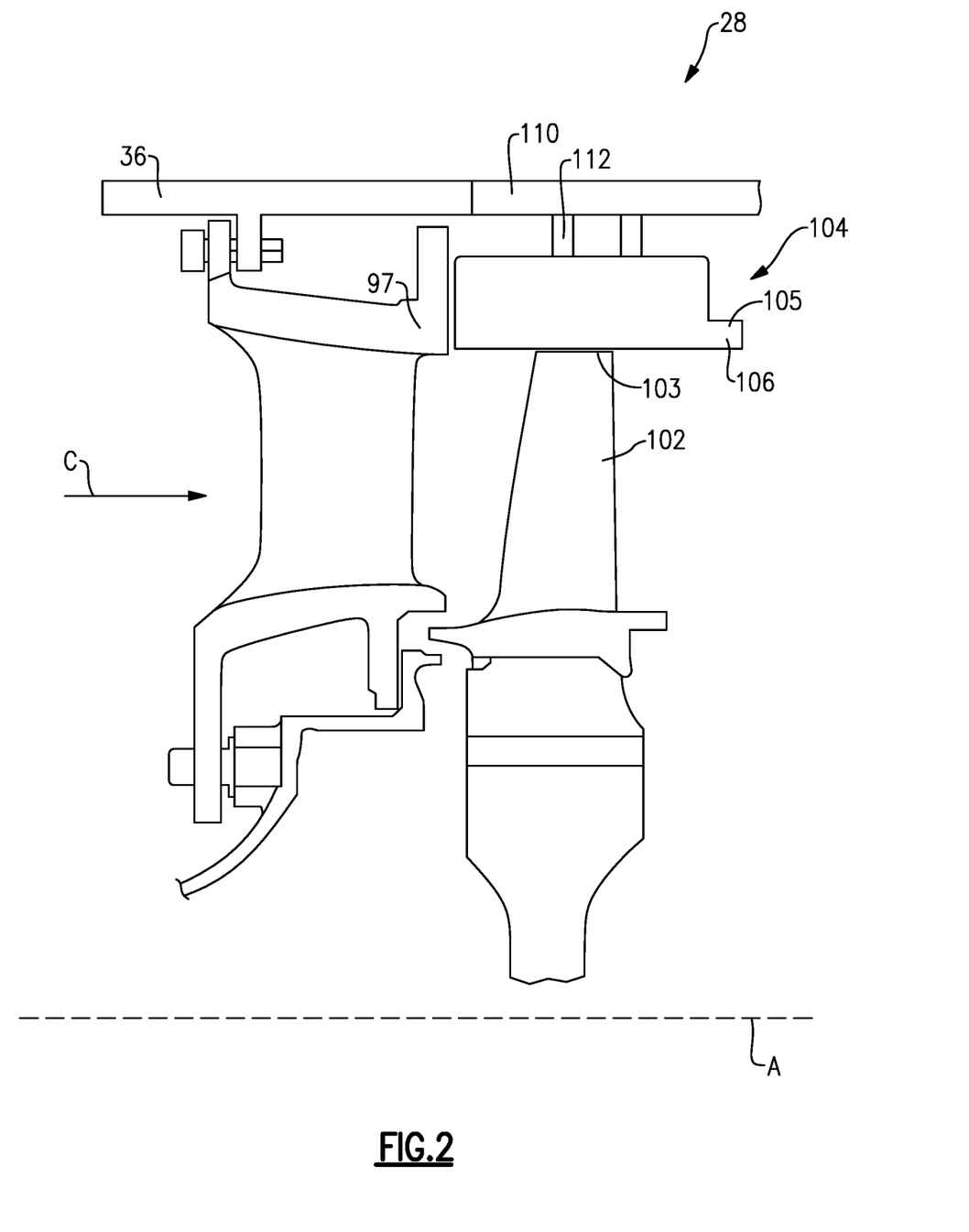
FIG. 2 illustrates a portion of a turbine section.

FIG. 2 shows a portion of an example turbine section 28, which may be incorporated into a gas turbine engine such as the one shown in FIG. 1. However, it should be understood that other sections of the gas turbine engine 20 or other gas turbine engines, and even gas turbine engines not having a fan section at all, could benefit from this disclosure. The turbine section 28 includes a plurality of alternating turbine blades 102 and turbine vanes 97.

A turbine blade 102 has a radially outer tip 103 that is spaced from a blade outer air seal assembly 104 with a blade outer air seal ("BOAS") 106. The BOAS 106 may be made up of a plurality of seal segments 105 that are circumferentially arranged in an annulus about the central axis A of the engine 20.

The BOAS 106 may be mounted to an engine case or structure, such as engine static structure 36 via a control ring or support structure 110 and a carrier 112. The carrier 112 may or may not be integral to the support structure 110. The support structure 110 may extend for a full 360° about the engine axis A. The engine case or support structure holds the BOAS 106 radially outward of the turbine blades 102. Although a BOAS 106 is described, this disclosure may apply to other components, and particularly flow path components. For example, this disclosure may apply to combustor liner panels, shroud, transition ducts, exhaust nozzle liners, or other CMC components.

Figure 3:
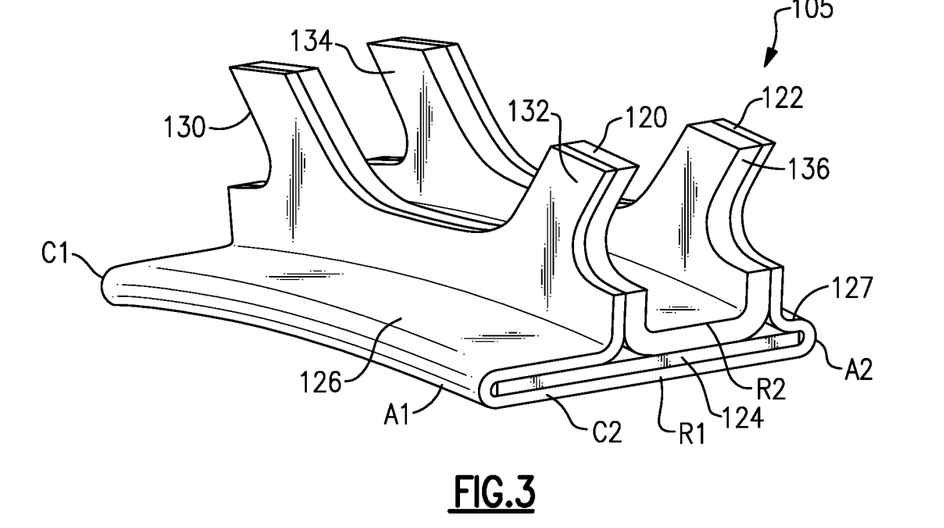
FIG. 3 illustrates a view of an exemplary blade outer air seal.

FIG. 3 illustrates an example BOAS seal segment 105. Each seal segment 105 is a body that defines radially inner and outer sides R1, R2, respectively, first and second axial sides A1, A2, respectively, and first and second circumferential sides C1, C2, respectively. The radially inner side R1 faces in a direction toward the engine central axis A. The radially inner side R1 is thus the gas path side of the seal segment 105 that bounds a portion of the core flow path C. The first axial side A1 faces in a forward direction toward the front of the engine 20 (i.e., toward the fan 42), and the second axial side A2 faces in an aft direction toward the rear of the engine 20 (i.e., toward the exhaust end).

In the illustrated example, each BOAS segment 105 includes a first wall 120 axially spaced from a second wall 122. The first and second walls 120, 122 extend generally radially outward from a base portion 124. The first and second walls 120, 122 may extend along an entire circumferential length of the seal segment 105, or may terminate circumferentially inward of the base portion 124. In this example, the first and second walls 120, 122 are generally parallel to one another and perpendicular to the base portion 124. In other examples, the first and second walls 120, 122 may be angled.

The base portion 124 extends between the first and second axial sides A1, A2 and defines a gas path on a radially inner side and a non-gas path on a radially outer side. The first wall 120 is spaced from the first axial side A1 to form a forward portion 126, and the second wall 122 is spaced from the second axial side A2 to form an aft portion 127. In this disclosure, forward, aft, upstream, downstream, axial, radial, or circumferential is in relation to the engine axis A unless stated otherwise.

Each of the first and second walls 120, 122 includes two hooks. The first wall 120 has a first hook 130 near the first circumferential side C1, and a second hook 132 near the second circumferential side C2. The first and second hooks 130, 132 form a dovetail shape. The second wall 122 has a third hook 134 near the first circumferential side C1, and a fourth hook 136 near the second circumferential side C2. The third and fourth hooks 134, 136 form a dovetail shape. The first and third hooks 130, 134 extend at an angle towards the first circumferential side C1. The first and third hooks 130, 134 may have generally the same size and shape as one another. The second and fourth hooks 132, 136 extend at an angle towards the second circumferential side C2. The second and fourth hooks 132, 136 may have generally the same size and shape as one another. The shape of the hooks 130, 132, 134, 136 may be selected to manage stiffness and stresses in the BOAS segment 105. The hooks 130, 132, 134, 136 may be machined into the first and second walls 120, 122, for example. The hooks 130, 132, 134, 136 provide angled surfaces for engaging with the carrier 112.

Figure 4:
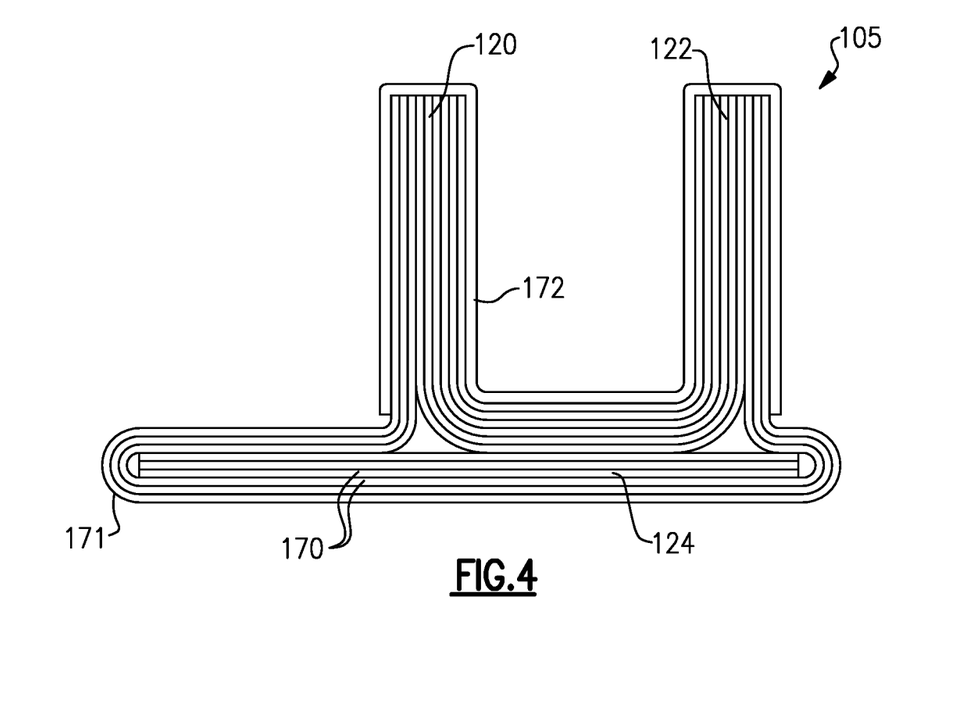
FIG. 4 illustrates a cross-sectional view of the exemplary blade outer air seal.

FIG. 4 illustrates a cross-sectional view of the example BOAS segment 105. The BOAS 106 may be formed of a ceramic matrix composite ("CMC") material. Each seal segment 105 is formed of a plurality of CMC laminate sheets 170. The laminate sheets 170 may be silicon carbide fibers, formed into a braided or woven fabric in each layer. In other examples, the BOAS 106 may be made of a monolithic ceramic.

CMC components such as BOAS segments 105 are formed by laying fiber material, such as laminate sheets or braids, in tooling, injecting a gaseous infiltrant into the tooling, and reacting to form a solid composite component. The component may be further processed by adding additional material to coat the laminate sheets. The simple arrangement of the base portion 124 and first and second walls 120, 122 allows for a simple ply layup.

In some examples, the base portion 124 and first and second walls 120, 122 may be formed from the same number of laminate plies, and thus have substantially the same thickness. A plurality of plies 170 are layered to form the BOAS segment 105. The plies 170 may be a braided or woven CMC material, such as 8-Harness Satin weave, for example. In this example, wraparound plies 171 form the outermost layers of the BOAS segment 105. The wraparound plies 171 extend about the base portion 124 and up the first and second walls 120, 122. The wraparound plies 171 may cover ends of some of the plies 170 in the base portion 124. Covering the exposed ends prevents the ends from being exposed to the gas path flow, which may cause delamination. In some embodiments, an overwrap ply 172 is arranged on an outer portion of the BOAS segment 105. In this example, the overwrap ply 172 is arranged about the first and second walls 120, 122. The overwrap ply 172 thus covers ends of some of the laminate plies 170 that terminate at the first and second walls 120, 122. The overwrap ply 172 may prevent plies from separating due to pressure loading. The disclosed ply configuration may mitigate delamination stresses. The overwrap ply 172 may be applied before machining features into the BOAS segment 105, in some examples. Although a particular ply layup is illustrated, this disclosure may extend to BOAS segments having different ply arrangements.

Figure 5:
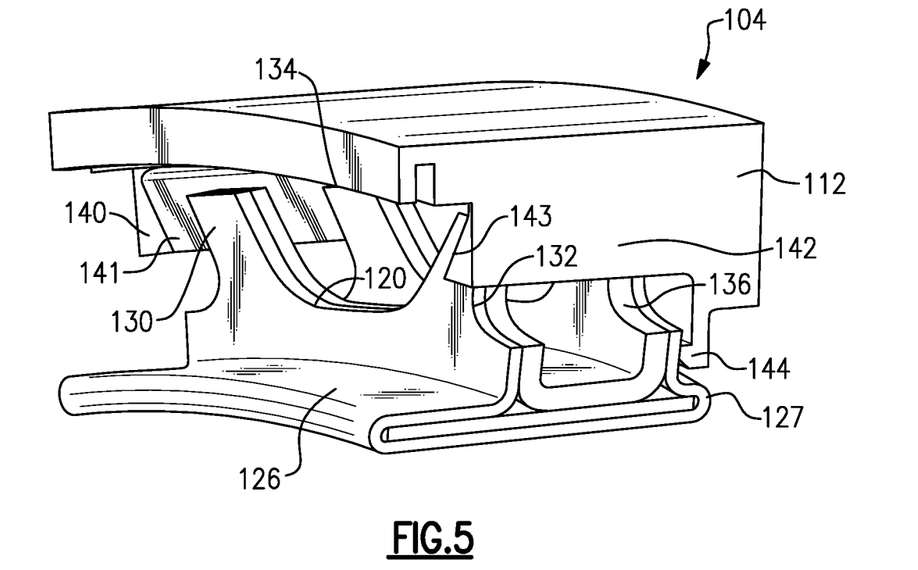
FIG. 5 illustrates a portion of the exemplary blade outer air seal assembly.

FIG. 5 illustrates an example BOAS assembly 104. The BOAS segment 105 is mounted in a carrier 112. The carrier 112 has a first radial portion 140 and a second radial portion 142. The first and second radial portions 140, 142 extend radially inwardly. The first radial portion 140 forms a first sloped surface 141, and the second radial portion 142 forms a second sloped surface 143. The first and third hooks 130, 134 abut the first sloped surface 141. The second and fourth hooks 132, 136 abut the second sloped surface 143. The carrier 112 may have a radially inwardly extending portion 144. In some examples, the radially inwardly extending portion 144 may contact the BOAS segment 105. In the illustrated example, the radially inwardly extending portion 144 contacts the second wall 122 and maintains an axial position of the BOAS segment 105.

Figure 6:
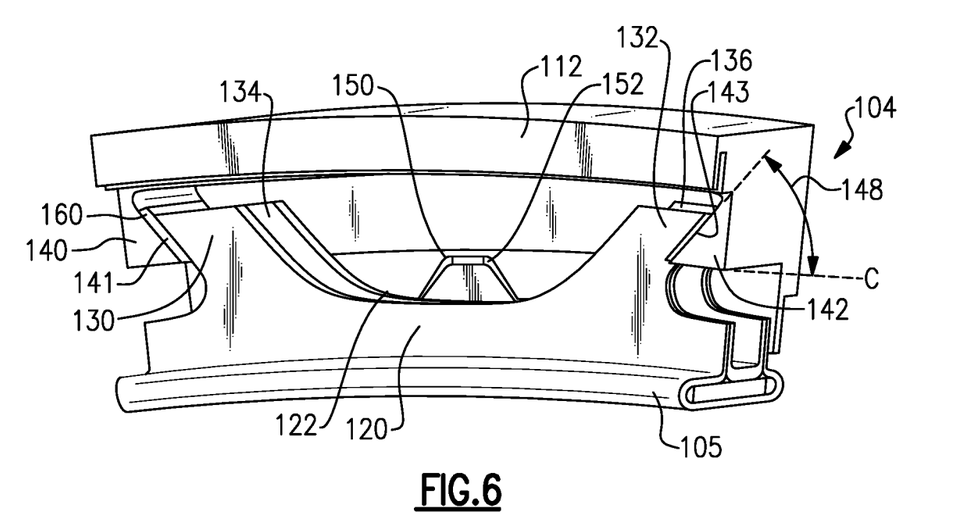
FIG. 6 illustrates a portion of the exemplary blade outer air seal assembly.

FIG. 6 illustrates another view of the example BOAS assembly 104. The second sloped surface 143 extends at an angle 148 relative to the circumferential direction C. The angle 148 may be between about 0 and 85°, for example. The first and second sloped surfaces 141, 143 may have the same angle. The hooks 130, 132, 134, 136 also extend at the angle 148 for retaining the BOAS segment 105 in place. The first and second sloped portions 141, 143 extend radially and circumferentially beyond the hooks 130, 132, 134, 136, which permits expansion of the BOAS segment 105 relative to the carrier 112.

In some examples, a liner 160 is arranged along the first and second sloped surfaces 141, 143 between the carrier 112 and the BOAS segment 105. The liner 160 may be sheet metal, for example. In other examples, the liner 160 may be a coating. The liner 160 eliminates contact between the BOAS segment 105 and the carrier 112.

In some examples, a tab 150 is arranged on the BOAS segment 105. The tab 150 may be on the first or second wall 120, 122, for example. A slot 152 is formed in the carrier 112 for receiving the tab 150. The tab 150 and slot 152 help maintain a circumferential position of the BOAS segment 105. In other examples, the tab 150 may be formed on the carrier 112, and a slot 152 may be formed on the BOAS segment 105.

Figure 7:
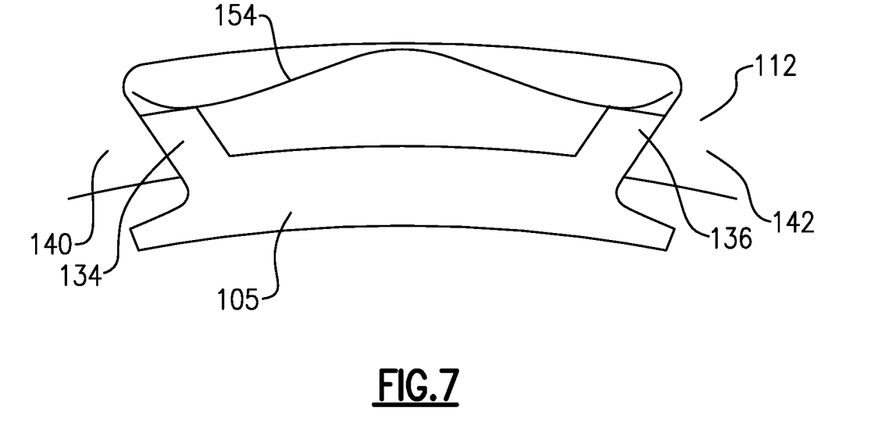
FIG. 7 illustrates a portion of an exemplary blade outer air seal assembly.

FIG. 7 illustrates another view of the example BOAS assembly 104. A resilient element 154 may be arranged between the carrier 112 and the BOAS segment 105 to bias the BOAS segment 105 radially inward. The element 154 helps prevent the BOAS segment 105 from shifting up one sloped surface 141, 143, and thus being angled with respect to the circumferential direction C. The element 154 may be a spring, for example. Some examples may include a resilient element 154 without a tab 150 and slot 152, and other examples may include a tab 150 and slot 152 without a resilient element 154. Although a particular resilient element 154 is shown, other example resilient elements 154 may be used. The resilient element 154 may be arranged within the slot 152, for example.

The disclosed BOAS assembly arrangement includes four sloped surfaces on the BOAS segment for attaching to the carrier 112. These four surfaces create independent regions on the part, which may limit thermal fight within the component. This arrangement constrains the BOAS segment in multiple directions, yet allows for uninhibited thermal growth between the CMC BOAS segment and support components. Features on the BOAS segment and support structure may be configured to optimize structural and bearing pressure capability to mitigate stresses due to mechanical loading.

In this disclosure, "generally axially" means a direction having a vector component in the axial direction that is greater than a vector component in the circumferential direction, "generally radially" means a direction having a vector component in the radial direction that is greater than a vector component in the axial direction and "generally circumferentially" means a direction having a vector component in the circumferential direction that is greater than a vector component in the axial direction.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A flow path component assembly, comprising:
   a support structure;
   a flow path component having a plurality of segments arranged circumferentially about an axis and mounted in the support structure by a carrier; and
   at least one of the segments having a first wall axially spaced from a second wall, the first wall having first and second hooks spaced apart from one another in a circumferential direction, the second wall having third and fourth hooks spaced apart from one another in the circumferential direction, wherein the first, second, third, and fourth hooks are in engagement with the carrier, wherein the flow path component is formed from a plurality of ceramic matrix composite plies, and an overwrap ply extends about the first and second walls, wherein a portion of the plurality ceramic matrix composite piles have ends that terminate at the first or second wall, and the overwrap ply covers the ends.

2. The flow path component assembly of claim 1, wherein the first hook extends generally in a first circumferential direction, and the second hook extends generally in a second circumferential direction opposite the first circumferential direction.

3. The flow path component assembly of claim 1, wherein the first and second hooks form a dovetail shape for engagement with the carrier.

4. The flow path component assembly of claim 3, wherein the third and fourth hooks form the dovetail shape for engagement with the carrier.

5. The flow path component assembly of claim 1, wherein the carrier has a first angled surface circumferentially spaced from a second angled surface, the first angled surface is in engagement with the first and third hooks and the second angled surface is in engagement with the third and fourth hooks.

6. The flow path component assembly of claim 5, wherein the carrier has a radially inwardly extending portion that extends circumferentially between the first angled surface and the second angled surface.

7. The flow path component assembly of claim 6, wherein the radially inwardly extending portion extends radially inward of the third and fourth hooks.

8. The flow path component assembly of claim 1, wherein the first and second walls extend from a base portion, and the base portion extends axially forward of the first wall and axially aft of the second wall.

9. The flow path component assembly of claim 1, wherein a tab extends from one of the first and second walls in a generally radial direction and engages a portion of the support structure.

10. The flow path component assembly of claim 9, wherein a slot is formed in the support structure for receiving the tab.

11. The flow path component assembly of claim 1, wherein a liner is arranged between the first, second, third, and fourth hooks and the carrier.

12. The flow path component assembly of claim 1, wherein the carrier is a metallic material.

13. The flow path component assembly of claim 1, wherein a resilient element is arranged between the carrier and the at least one segment, the resilient element configured to bias the at least one segment radially inward.

14. A turbine section for a gas turbine engine, comprising:
    a turbine blade extending radially outwardly to a radially outer tip and for rotation about an axis of rotation;
    a blade outer air seal having a plurality of seal segments arranged circumferentially about the axis and mounted radially outward of the radially outer tip by a carrier;
    at least one of the seal segments having a first wall axially spaced from a second wall, the first wall having first and second hooks spaced apart from one another in a circumferential direction, the second wall having third and fourth hooks spaced apart from one another in the circumferential direction, wherein the first, second, third, and fourth hooks are in engagement with the carrier, wherein the carrier has a first angled surface circumferentially spaced from a second angled surface, the first angled surface is in engagement with the first and third hooks and the second angled surface is in engagement with the third and fourth hooks, and wherein a tab extends from one of the first and second walls in a generally radial direction and engages a portion of the carrier, and a slot is formed in the carrier for receiving the tab.

15. The turbine section of claim 14, wherein the first hook extends generally in a first circumferential direction, and the second hook extends generally in a second circumferential direction opposite the first circumferential direction.

16. The turbine section of claim 14, wherein the first and second hooks form a dovetail shape for engagement with the carrier, and the third and fourth hooks form the dovetail shape for engagement with the carrier.

17. The turbine section of claim 14, wherein the blade outer air seal is a ceramic material.

18. The turbine section of claim 17, wherein a metallic liner is arranged between the first, second, third, and fourth hooks and the carrier.

19. The turbine section of claim 14, wherein the carrier is a metallic material.

* * * * *